P. KAISER.
INCUBATOR.
APPLICATION FILED FEB. 17, 1919.

1,369,816.

Patented Mar. 1, 1921.
3 SHEETS—SHEET 1.

Witnesses:
W. L. Kilroy
Harry R. L. White

Inventor:
Peter Kaiser
By John Howard McElroy
his Atty

P. KAISER.
INCUBATOR.
APPLICATION FILED FEB. 17, 1919.
1,369,816. Patented Mar. 1, 1921.
3 SHEETS—SHEET 2.
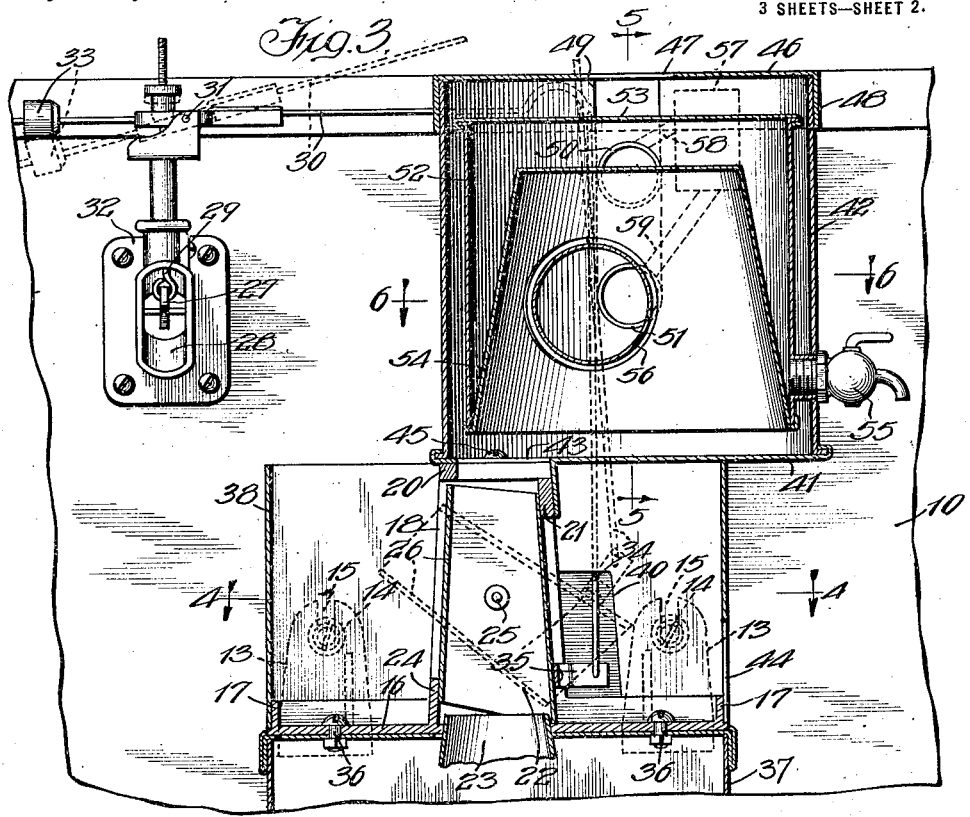
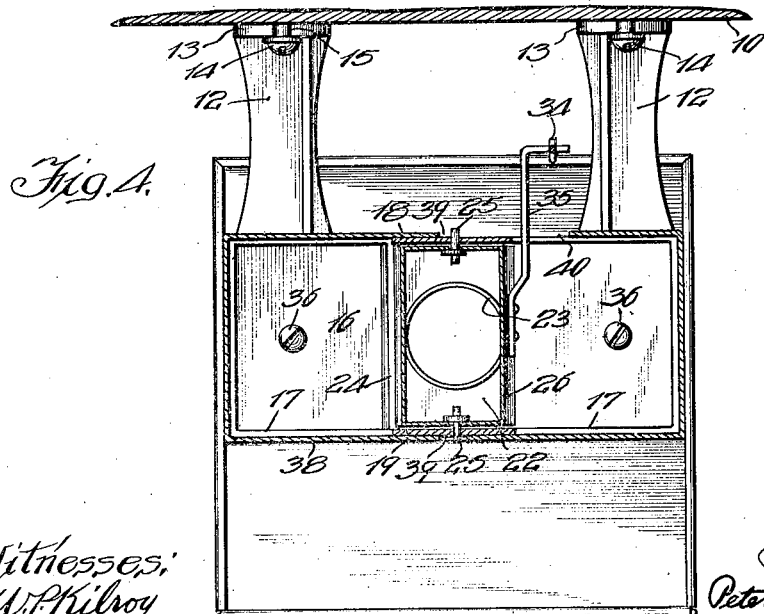
Witnesses:
W. F. Kilroy
Harry R. L. White
Inventor:
Peter Kaiser
By John Howard McElroy
his Atty.

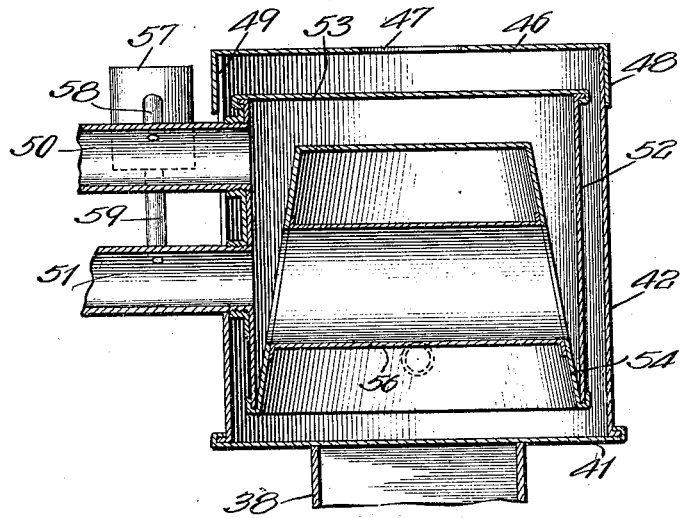
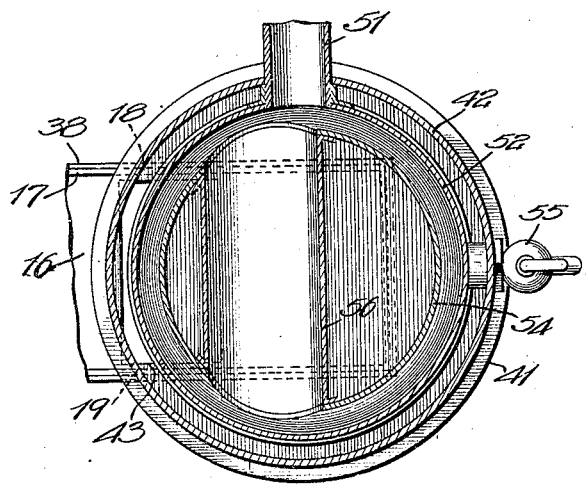
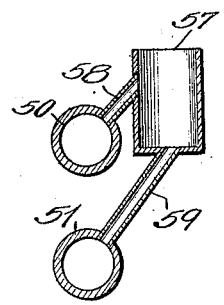

UNITED STATES PATENT OFFICE.

PETER KAISER, OF CROWN POINT, INDIANA, ASSIGNOR TO 103 DEGREE INCUBATOR COMPANY, OF CROWN POINT, INDIANA, A CORPORATION OF INDIANA.

INCUBATOR.

1,369,816.     Specification of Letters Patent.     Patented Mar. 1, 1921.

Application filed February 17, 1919. Serial No. 277,588.

*To all whom it may concern:*

Be it known that I, PETER KAISER, a citizen of the United States, and a resident of Crown Point, in the county of Lake and State of Indiana, have invented certain new and useful Improvements in Incubators, of which the following is a full, clear, and exact specification.

My invention is concerned with a warm water generating plant for incubators which is controlled by a thermostat to keep the water circulating therethrough supplied at a temperature which will keep the temperature of the inside of the incubator constant during all the extremes of weather that may be met with, and to this end consists of a novel construction which will be fully described and the novel features thereof particularly pointed out in the claims.

One of the difficult points is to produce such a generating plant on a small scale as shall not be deleteriously affected by the gusts of wind that are met with in warm or hot weather, when the incubator is kept in a room or place where such gusts have access to it, and my plant is so designed that it is impossible to blow out the lamp by such gusts, although the hot air rising from the lamp can be readily deflected away from the hot water reservoir when the interior of the incubator becomes too warm.

To illustrate my invention, I annex hereto three sheets of drawings in which the same reference characters are used to designate identical parts in all the figures, of which—

Fig. 3 is a vertical section, on an enlarged scale, on the line 3—3 of Fig. 2;

Fig. 4 is a plan view in horizontal section on the line 4—4 of Fig. 3;

Fig. 5 is a vertical section on the line 5—5 of Fig. 3;

Fig. 6 is a horizontal section on the line 6—6 of Fig. 3; and

Fig. 7 is a vertical section, on an enlarged scale, on line 7—7 of Fig. 2.

Figure 1:
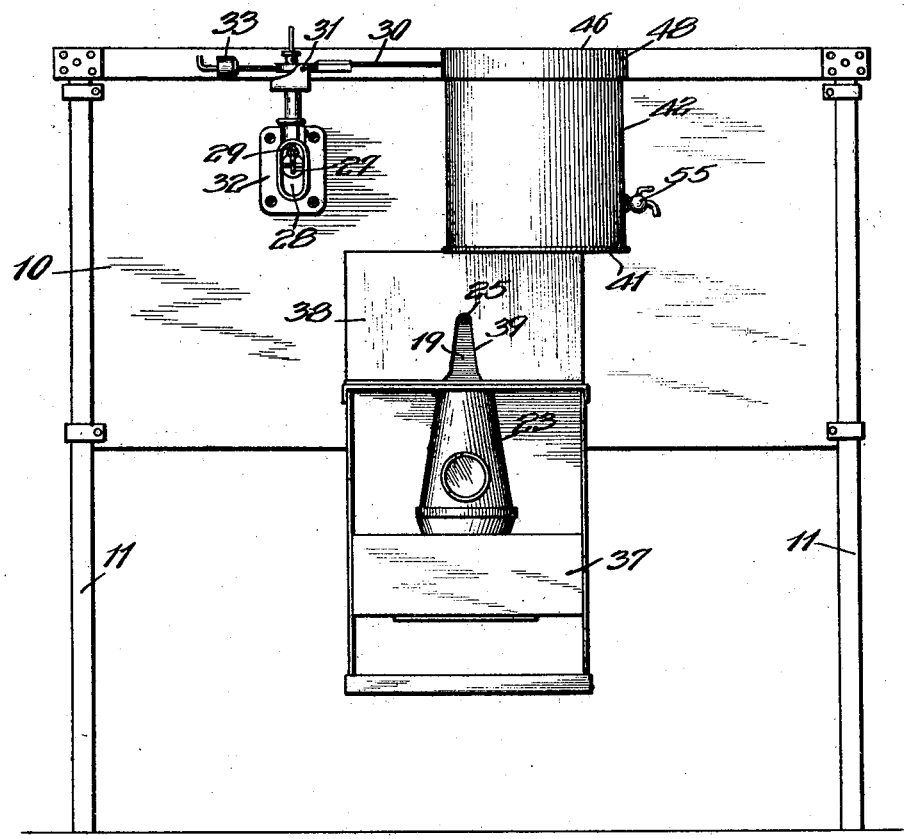
Figure 1 is a side elevation of an incubator having my improvements applied thereto.
Figure 2:
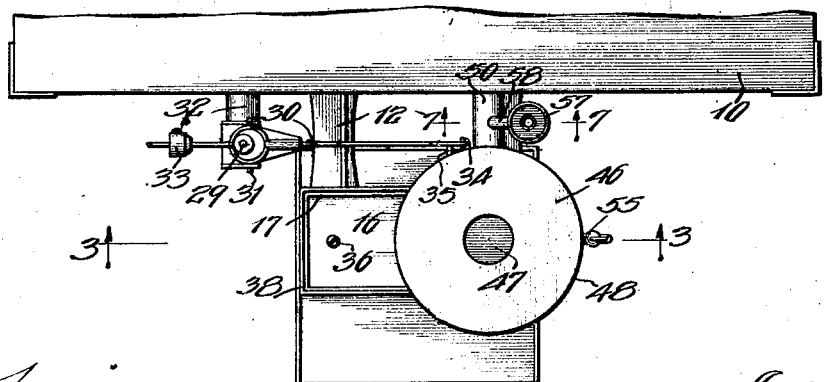
Fig. 2 is a top plan view of one end of the same.

The casing 10 may be of any desired construction, and is supported on the legs 11, and the interior of the casing is supplied with some arrangement of warm water circulating pipes, such for instance as are shown in my Patent 1,190,418, dated July 11, 1916. Projecting outwardly from the end of the casing 10 is a bracket casting which preferably has the pair of arms 12 with the upturned feet 13 which are secured to the side of the casing as by the screws 14 passed through the slots 15 so that the position of the bracket can be adjusted to a nicety. At the outer ends of the arms 12 is formed the horizontal base 16 of the casting (see Fig. 4) which base is preferably in the form of a rectangle, and has at the ends thereof the two upwardly projecting three-sided flanges 17 surrounding its ends. At the center are the two upwardly projecting standards 18 and 19, which might be structurally considered as constituting extensions of the flanges 17 on their respective sides, and these standards 18 and 19 are connected at their upper ends by the two crosspieces 20 and 21, the crosspiece 20 being located at a slightly higher elevation than the crosspiece 21 for the purpose to be described. At the center of the base 16 is the rectangular aperture 22, into which extends the upper end of the lamp chimney 23. At the right-hand side of the aperture 22 is the upwardly projecting flange 24 forming a part of the base 16 and preferably extending slightly higher than the adjacent flange 17.

Pivoted in suitable apertures in the standards 18 and 19 by the pintles 25 secured in the sides thereof is the swinging flue 26, which is preferably constructed of sheet metal and is rectangular in horizontal cross-section, and preferably having the sides thereof converging slightly toward the top, as seen in Fig. 3. The top of the right-hand side engages the crosspiece 21, being normally held against said crosspiece by the gravity of the apparatus, and the lower edge of the opposite side likewise normally engages the flange 24.

Located within the incubator casing at any suitable place is a thermostat element, such as those shown in my above mentioned patent, the expansion of which swings a lever 27 suitably fulcrumed in the interior of the casing and having an arm projecting outwardly through an aperture 28 in the casing and connected by the link 29 with one arm of a lever 30 fulcrumed at 31 in a supporting bracket 32 secured to the side of the incubator casing. The arm of the lever 30 to which the link 29 is connected is provided with the weight 33 adjustably secured thereon, so the parts can be balanced as desired, and the end of the other arm is connected by the link 34 with an arm 35, best seen in Figs. 3 and 4, which is riveted to the right-hand side of the pivoted flue 26.

Secured to the under side of the base 16 of the bracket casting, as by the bolts and nuts 36 is the housing 37, which is preferably composed of sheet metal, and serves to support the base of the lamp therein, the chimney 23 of which has been previously referred to as having its upper end registering with the aperture 22 in the base 16 and normally in alinement with the pivoted flue 26.

Understanding that the hot air and products of combustion arising from the lamp ascend through the flue 26 and are normally delivered to the warm water reservoir to be described, it will further be understood that when the temperature of the interior of the incubator becomes too great the thermostat element by its expansion swings the outer end of lever 27 downward, pulling down the link 29, which through the lever 30 lifts the link 34 and swings the pivoted flue 26 to the dotted line position in which the upper end discharges the hot air passing therethrough into the atmosphere without coming into contact with the hot water reservoir, or if the pivoted flue is turned to its extreme position, the hot air is deflected by the left-hand side thereof away from the hot water reservoir. With the construction thus far described, it will be obvious that when the pivoted flue is in its tilted position, if a gust of air should come from the left-hand side, it would strike that side of the pivoted flue and be deflected downward therefrom into the chimney 23 and extinguish the lamp, and to prevent this occurrence I provide the wind shield casing 38, which is preferably made of sheet metal, and, as best seen in Fig. 4, is of a generally rectangular shape in horizontal cross-section, and is of the proper dimension so that its bottom can be sprung over and will fit snugly against the flanges 17 holding it in place. To accommodate the ends of the pintles 35, which are preferably of some length so that the pivoted flue 26 can swing freely and without any possibility of binding no matter how hot it gets, the wind shield casing has the angular notches 39 cut in the sides thereof, and likewise to permit the arm 35 to swing freely through its range of movement, the rear side of the wind shield casing 38 has the larger recess 40 cut therein, which recess may be made continuous with or a part of the recess 39 on that side. As the gusts of air coming from the right-hand side will not be deflected downward into the chimney 23 by the inclination of the sides of the pivoted flue 26, I might dispense with the wind shield 38 on this side, but I preferably employ it and utilize it in part as a support for the bottom 41 of the cylindrical hot air casing 42. To permit the entrance of cool air to the inlet aperture 43 in the bottom 41 of the hot air casing 42 when the pivoted flue 26 is tilted, I preferably provide the inlet 44 in the right-hand side of the wind shield casing 38. The hot air casing 42 is preferably constructed of sheet metal and is supported on the top of that side of the wind shield casing 38, and is also supported on the top of the standards 18 and 19 and on the crosspiece 20, preferably being secured in place by the screws 45 passed through apertures in the said bottom 41 and threaded into the tops of the standards 18 and 19. The top of the hot air casing 42 preferably consists of a cover 46 of sheet metal having the central aperture 47 therein and the downwardly projecting flange 48 which fits snugly on the top of the sides of the casing. A slot 49 is provided in the side of the casing 42 adjacent to the body of the incubator, to accommodate the two pipes 50 and 51 which extend from the interior of the warm water reservoir 52 into the interior of the incubator casing and are connected to the water circulating pipes so that warm water rising from the reservoir 52 flows outward through the pipe 50 to the water circulating system in the interior of the incubator and when cool returns through the pipe 51 to the bottom of the warm water reservoir 52. This reservoir 52 preferably consist of a sheet metal cylinder having the imperforate top 53 secured thereon and a deeply concave bottom 54, which preferably takes the form of a truncated cone secured at its larger end to the bottom of the cylindrical outer portion of the casing. A cock 55 to draw off the water is secured to the bottom of the reservoir and extends through a suitable aperture in the hot air casing 42.

The hot air and products of combustion rising through the pivoted flue 26 in its normal position rise through the inlet 43 and ascend to the convex bottom 54 and the heat thereof is absorbed by the water in the warm water reservoir, and as the hot air already in the bottom is cooler it is displaced by the hot air that is constantly rising, and it ascends through the annular passage between the outside of the warm water reservoir 52 and the inside of the hot air casing 42, and passing over the top 53 of the warm water reservoir and finally escapes through the outlet aperture 47. I have found that much more efficient action is obtained by introducing the comparatively large tube 56 in the bottom so that it is kept filled with the water and is located where the cooler water from the tube 51 returning from the incubator enters the tube 56 at once and receives all the available heat of the hot air coming out through the pivoted flue 26.

To keep the circulating system provided with hot water, I provide the filling cup 57, best seen in Fig. 7, which is connected with the pipes 50 and 51 by the small pipes 58 and 59.

While I have herein shown and described my novel reservoir, I do not herein claim same, as it is made the subject matter of my divisional application No. 336,984, filed November 10, 1919.

While I have shown and described my invention as embodied in the form which I consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States is:

1. In an apparatus of the class described, the combination with a warm water reservoir and piping connected therewith, of a lamp beneath the reservoir having a stationary chimney thereon, a flue pivoted near its center between the top of the chimney and the bottom of the reservoir, a thermostat element, connections between the thermostat element and the pivoted flue to swing the latter to deflect the heated air from the warm water reservoir when the temperature at the thermostat is too great, and a wind shield casing open at the top but otherwise inclosing the pivoted flue on the side toward which the top is swung by the action of the thermostat element.

2. In an apparatus of the class described, the combination with a warm water reservoir and piping connected therewith, of a lamp beneath the reservoir having a stationary chimney thereon, a flue pivoted near its center between the top of the chimney and the bottom of the reservoir, a thermostat element, connections between the thermostat and the pivoted flue to swing the latter to deflect the heated air from the warm water reservoir when the temperature at the thermostat is too great, and a rectangular wind shield casing surrounding the pivoted flue on all sides thereof, that portion of the casing above the side toward which the top of the pivoted flue is swung by the action of the thermostat element being open for the purpose described.

3. In an apparatus of the class described, the combination with an incubator casing, of a bracket projecting from the side thereof and having a horizontal web provided at its ends with an upturned flange and at its center with a pair of standards, a flue member pivoted between the standards, a lamp supported from the bracket and having the top of its chimney registering with the bottom of the flue in the normal position of the latter, a wind shield casing fitting over the flange and extending up to the top of the standards, and a warm water reservoir connected by circulating pipes with the interior of the incubator and supported above the standards.

4. In an apparatus of the class described, the combination with an incubator casing, of a bracket projecting from the side thereof and having a horizontal web provided at its ends with an upturned flange and at its center with a pair of standards, a flue member pivoted between the standards, a lamp supported from the bracket and having the top of its chimney registering with the bottom of the flue in the normal position of the latter, a wind shield casing connected to the flanges and extending to the top of the standards, a warm water reservoir connected by circulating pipes with the interior of the incubator casing and supported above the standards, and a hot air casing having a hot air outlet in the center of its top surrounding the warm water reservoir and supported on the top of the standards and having a hot air inlet registering with the top of the flue member in the normal position of the latter.

In witness whereof I have hereunto set my hand and affixed my seal this 12th day of Feb. A. D. 1919.

PETER KAISER. [L. S.]

Witnesses:
 CLAYTON D. ROOT,
 MARTIN J. SMITH.